(No Model.)

L. CAMPBELL.
FLOAT FOR WATER GAGE GLASS TUBES.

No. 362,719. Patented May 10, 1887.

Witnesses
J. W. Garner
H. M. Shotwell

Inventor
Loudon Campbell,
By his Attorneys
Freeman & Ovey

UNITED STATES PATENT OFFICE.

LOUDON CAMPBELL, OF ALEXANDRIA, VIRGINIA.

FLOAT FOR WATER-GAGE GLASS TUBES.

SPECIFICATION forming part of Letters Patent No. 362,719, dated May 10, 1887.

Application filed January 14, 1887. Serial No. 224,343. (No model.)

*To all whom it may concern:*

Be it known that I, LOUDON CAMPBELL, a citizen of the United States, residing at Alexandria, in the county of Alexandria and State of Virginia, have invented certain new and useful Improvements in Water-Gages for Steam-Boilers; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to an improvement in water-gages for steam-boilers; and it consists in a float for the glass tube of a water-gage, the said float being provided with projecting flanges, of glass or metal, to protect it from contact with the sides of the tube, and also to clear away froth and scum from the inner surface of the water-tube, and thereby render the float distinctly visible at all times to indicate the precise height of the water in the boiler, as will be more fully set forth hereinafter, and particularly pointed out in the claim.

Figure 1:
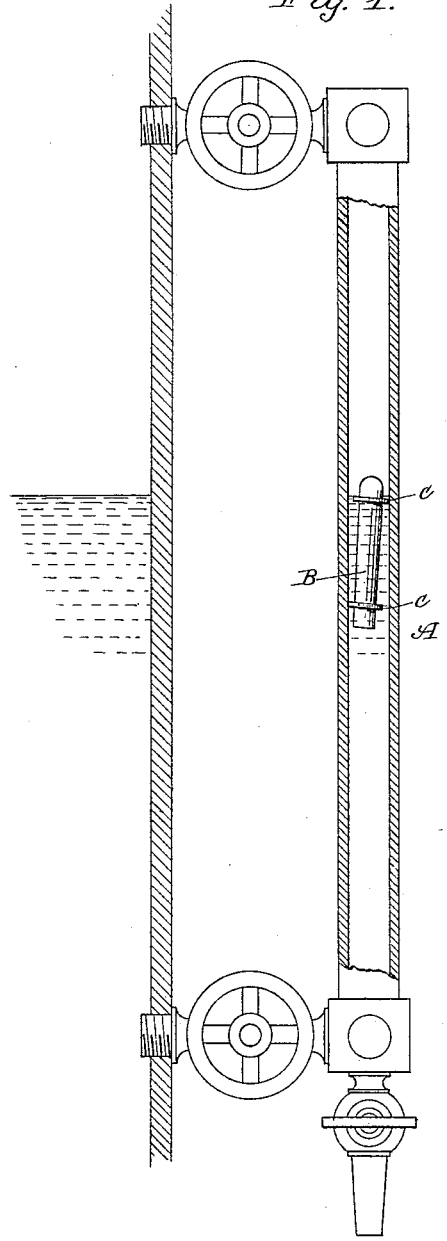
Figure 2:
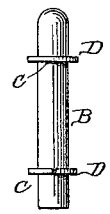
Figure 3:
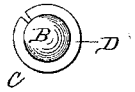

In the drawings, Figure 1 is a vertical sectional view of a water-gage embodying my improvements. Fig. 2 is a detailed elevation of the float. Fig. 3 is an end elevation of the same.

A represents the glass tube of a water-gage, such as are in common use on steam-boilers, the said tube having cocks at its upper and lower ends to communicate with the boiler.

B represents a cylindrical float, made of glass or other material, and arranged in the glass tube and adapted to rise and fall therein, and thereby indicate the precise height of the water in the tube. This float may be colored, or it may be covered with phosphorescent paint, to render it luminous at night, and thus enable the float to be readily distinguished in the tube. From the sides of the float project encircling flanges C. These flanges are formed by slipping metallic open rings D over the float and compressing them against the sides thereof, so as to clamp the rings thereto. These rings or flanges serve a useful purpose by scraping the interior of the glass tube as the float rises and falls therein by the ebullition of the water, thus preventing froth and scum from adhering to the inner sides of the glass tube and obscuring the float.

Having thus described my invention, I claim—

In a water-gage for steam-boilers, the float arranged in the glass tube and having the encircling-rings forming projecting flanges, for the purposes set forth, substantially as described.

In testimony whereof I affix my signature in presence of two witnesses.

LOUDON CAMPBELL.

Witnesses:
 GEO. JOHNSTON,
 LEONARD MARBURY.